(12) United States Patent
Cohen et al.

(10) Patent No.: US 11,287,089 B1
(45) Date of Patent: Mar. 29, 2022

(54) PROCESS FOR FUELING OF VEHICLE TANKS WITH COMPRESSED HYDROGEN COMPRISING HEAT EXCHANGE OF THE COMPRESSED HYDROGEN WITH CHILLED AMMONIA

(71) Applicant: Air Products and Chemicals, Inc., Allentown, PA (US)

(72) Inventors: Joseph P. Cohen, Bethlehem, PA (US); Lucas A. White, Chandler, AZ (US); Robert Gregory Wolf, Hackettstown, NJ (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 17/219,945

(22) Filed: Apr. 1, 2021

(51) Int. Cl.
  *F17C 5/06* (2006.01)
  *C01B 3/02* (2006.01)
  *C01B 3/04* (2006.01)
  *F28D 15/02* (2006.01)

(52) U.S. Cl.
  CPC ............... *F17C 5/06* (2013.01); *C01B 3/047* (2013.01); *F28D 15/0266* (2013.01); *F17C 2221/012* (2013.01); *F17C 2227/0341* (2013.01); *F17C 2265/065* (2013.01); *F17C 2270/0168* (2013.01)

(58) Field of Classification Search
  CPC ............... F17C 5/06; F17C 2221/012; F17C 2270/0168; F17C 2265/065; F17C 2227/0341; F28D 15/0266; C01B 3/047
  USPC .......................................................... 141/11
  See application file for complete search history.

(56) References Cited

U.S. PATENT DOCUMENTS

| 4,704,267 A * | 11/1987 | DiMartino | C01B 3/047 423/658.2 |
| 4,903,496 A * | 2/1990 | Mandrin | F17C 5/06 62/402 |
| 6,936,363 B2 * | 8/2005 | Kordesch | B01J 19/249 429/416 |

(Continued)

FOREIGN PATENT DOCUMENTS

| GB | 711428 A * | 6/1954 | F28F 19/00 |
| WO | WO-2015080454 A1 * | 6/2015 | F02C 3/22 |
| WO | WO-2020095467 A1 * | 5/2020 | C01C 1/10 |

OTHER PUBLICATIONS

WO-2015080454-A1 English Translation of Specification (Year: 2021).*

(Continued)

*Primary Examiner* — Timothy P. Kelly
*Assistant Examiner* — Stephanie A Shrieves
(74) *Attorney, Agent, or Firm* — Matthew R. Weaver

(57) ABSTRACT

The invention relates to a process for fueling of vehicle tanks with compressed hydrogen comprising splitting ammonia into hydrogen and nitrogen in an ammonia cracking unit, compressing the hydrogen from the ammonia cracking unit, and dispensing the compressed hydrogen to the vehicle tanks in a hydrogen fueling unit comprising one or more dispensing units, wherein chilled ammonia is used to cool the compressed hydrogen before being dispensed to the vehicle tanks by heat exchange between the compressed hydrogen and the chilled ammonia so that the chilled ammonia is heated, and transferring the heated ammonia to the ammonia cracking unit.

13 Claims, 1 Drawing Sheet

(56) References Cited

U.S. PATENT DOCUMENTS

| | | | | |
|---|---|---|---|---|
| 2002/0028171 | A1* | 3/2002 | Goetsch | B01J 12/007 |
| | | | | 423/237 |
| 2004/0154223 | A1* | 8/2004 | Powell | C01B 3/56 |
| | | | | 48/197 R |
| 2004/0163731 | A1 | 8/2004 | Eichelberger et al. | |
| 2009/0304574 | A1* | 12/2009 | Ravikumar | C01B 3/047 |
| | | | | 423/658.2 |
| 2010/0330446 | A1* | 12/2010 | Lucka | C01B 3/382 |
| | | | | 429/425 |
| 2012/0216915 | A1* | 8/2012 | Takata | F28D 7/14 |
| | | | | 141/82 |
| 2014/0102587 | A1* | 4/2014 | Nagura | B60L 58/40 |
| | | | | 141/69 |
| 2014/0105816 | A1* | 4/2014 | Grannell | C01B 3/06 |
| | | | | 423/658.2 |
| 2014/0356738 | A1* | 12/2014 | Bell | H01M 8/0662 |
| | | | | 429/411 |
| 2016/0146400 | A1* | 5/2016 | Allidieres | F17C 5/06 |
| | | | | 141/4 |
| 2017/0254479 | A1* | 9/2017 | Petersen | F17C 5/00 |

OTHER PUBLICATIONS

WO-2020095467-A1 English Translation of Specification (Year: 2022).*

* cited by examiner

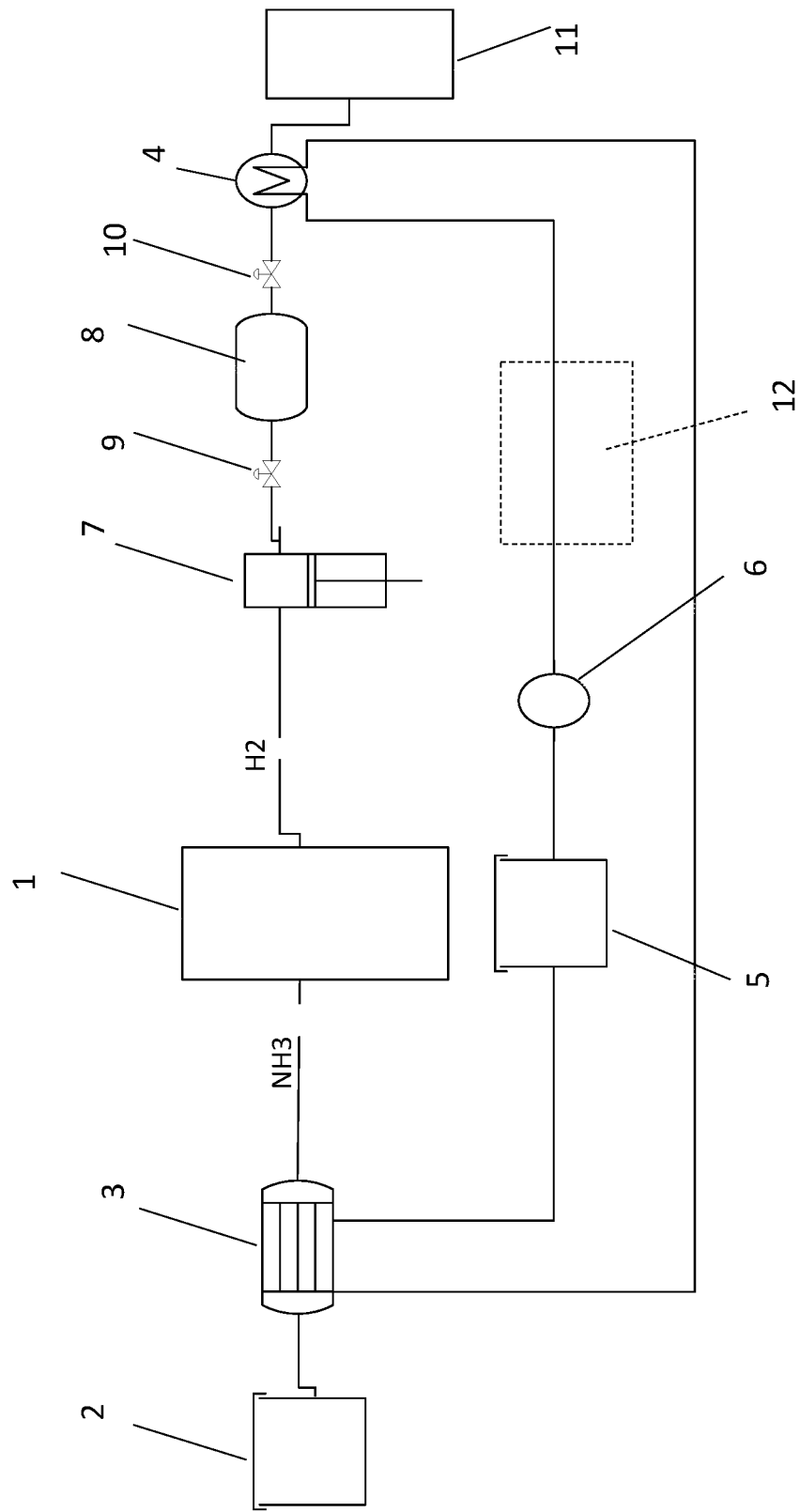

PROCESS FOR FUELING OF VEHICLE TANKS WITH COMPRESSED HYDROGEN COMPRISING HEAT EXCHANGE OF THE COMPRESSED HYDROGEN WITH CHILLED AMMONIA

FIELD

The present invention relates to a process for fueling of vehicle tanks with compressed hydrogen comprising splitting ammonia into hydrogen and nitrogen in an ammonia cracking unit, compressing the hydrogen from the ammonia splitting unit, and dispensing the compressed hydrogen in a hydrogen fueling station comprising one or more dispensing units to the vehicle tanks, and to a system for performing said process.

BACKGROUND

Several configurations and systems for fueling of hydrogen-driven vehicles in hydrogen fueling stations are known in the art. For example, US 2004/163731 (A1) discloses a self-contained mobile gas fueling station.

Hydrogen can be delivered to such stations either by supplying them with compressed or even liquid hydrogen, or by means of a chemical "carrier" comprising hydrogen from which hydrogen is split off at or close to the station.

For example, US 2009/304574 (A1) describes processes and configurations in which a hydrogen fueling station receives liquid ammonia and in which hydrogen is produced from said ammonia by catalytic cracking. The so produced hydrogen is then compressed and fed to a filling dock.

In refueling vehicles and/or charging compressed hydrogen storage vessels it is desirable to charge the respective compressed hydrogen receiver in a time efficient manner without violating the vessel temperature limit. For example, it is provided that hydrogen-powered vehicles be filled to a nominal 700 bar within 3 minutes, without violating the temperature limit of the receiving vessel, which typically is 85° C. for vehicle fuel tanks. At the same time, it is required that the temperature of the hydrogen does not drop below −40° C., while entering the fuel tank during the filling process.

When compressed hydrogen is obtained by splitting of ammonia into hydrogen and nitrogen and subsequent compressing of the hydrogen, its temperature is usually too high for fueling of vehicle tanks, so that the compressed hydrogen must be cooled before fueling can be effected.

Generally, known systems for cooling of compressed hydrogen fall into two main categories: mechanical refrigeration or liquid hydrogen sourced systems where the liquid hydrogen provides the chilling for dispensing, either via indirect heat transfer from different part of the process, or via not warming the hydrogen above the desired dispensing temperature.

In processes using ammonia cracking in order to obtain hydrogen for fueling, liquid hydrogen is usually not available so that, conventionally, the only option for cooling the compressed hydrogen is mechanical refrigeration. This, however, is associated with investment costs for the refrigeration equipment and with power consumption during its operation.

It is therefore the object of the present invention to improve and further integrate a process and a system comprising a hydrogen fueling station and an ammonia cracking unit in which hydrogen is produced which is then further compressed for fueling, which makes use of synergistic effects between the units and hence provides a higher degree of integration of the entire system. In particular the present invention aims at minimizing the need for on-site mechanical refrigeration in such processes/systems.

SUMMARY

The invention is based on the finding that this object can be achieved if the cooling capacity of chilled ammonia delivered to the ammonia cracking unit is exploited for cooling of the compressed hydrogen before fueling of the vehicle tanks.

The invention therefore provides a process for fueling of vehicle tanks with compressed hydrogen comprising splitting ammonia into hydrogen and nitrogen in an ammonia cracking unit, compressing the hydrogen from the ammonia cracking unit, and dispensing the compressed hydrogen to the vehicle tanks in a hydrogen fueling unit comprising one or more dispensing units, wherein chilled ammonia, typically in a liquid state, is used to cool the compressed hydrogen before being dispensed to the vehicle tanks by heat exchange between the compressed hydrogen and the chilled ammonia which after the heat exchange is transferred to the ammonia cracking unit.

The process of the invention allows to make use of the cooling potential of the chilled ammonia as it is delivered to or stored at the fueling station and hence obviates or at least minimizes the need to provide mechanical on-site refrigeration. Furthermore, as ammonia usually is to be delivered to the ammonia cracking unit at ambient temperature it is a further advantage of the present invention that the chilled ammonia is heated due to the heat exchange with the compressed hydrogen. The process of the invention provides a higher degree of integration of the components of the fueling station.

Chilled ammonia is to be understood as ammonia which has a temperature below ambient temperature (which may be 21° C.), usually at least 5° C. below ambient temperature, Usually, chilled ammonia is in liquid state.

In a preferred embodiment of the process, the heat exchange between the chilled ammonia and the compressed hydrogen is effected by a first heat exchange between the chilled ammonia and a heat exchange fluid in a first heat exchanger and second heat exchange of the heat exchange fluid and the compressed hydrogen in a second heat exchanger.

Usually, the heat transfer fluid will be circled in a closed heat exchange fluid loop, in which the fluid is transported through, preferably, insulated pipes from the first to the second heat exchanger, usually by means of one or more pumps.

Preferably, at least part of the heat exchange fluid is stored in one or more heat exchange fluid storage tank(s).

The presence of one or more heat fluid storage tanks allows the first and the second heat exchange independently from each other, so that they, for example, have not to be effected simultaneously. For example, captured cold heat exchange fluid obtained from the first heat exchanger may be stored until needed for cooling of compressed hydrogen before dispensing.

The heat exchange fluid storage tank(s) can be located downstream or upstream of the first heat exchanger, preferably at least one storage tank is present which is located downstream of the first heat exchanger so that the fluid stored has the temperature as obtained after the first heat exchange.

At least one of the one or more pumps in the fluid heat exchange fluid loop may be located downstream of the first, and upstream of the second heat exchanger, for example in close proximity to the first heat exchanger.

Preferably, the heat exchange fluid is stored in the storage tank at a temperature at or close to the temperature it has after the second heat exchange, and/or is stored at a temperature at or close to the temperature it has after the first heat exchange.

The first and/or the second heat exchange preferably is/are in counter flow. Accordingly, the first and/or second heat exchanger is are counter flow heat exchanger(s).

In the process of the invention, a conventional refrigeration system, such as a mechanical refrigeration system, may be present for (further) cooling of the heat exchange fluid, either as additional source for cooling of the heat exchange fluid in case this is needed because cooling provided in the first heat exchange is not sufficient and/or as a back-up system for the case where the first heat exchanger is not in operation.

If present, such a conventional refrigeration system is usually integrated into the heat exchange fluid loop, an example of which is illustrated in FIG. 1, which shows a conventional refrigeration system 12 (in broken line) within the heat exchange fluid loop.

In one embodiment of the process of the invention, the chilled ammonia is in liquid state before the first heat exchange and the first heat exchange involves vaporizing liquid ammonia at least in part.

In this embodiment, an additional phase-change fluid may be employed to bridge the difference between the optimal phase change temperature of the liquid ammonia and temperature needed for hydrogen cooling.

The vaporization of liquid ammonia is usually effected at normal or sub-atmospheric pressure, and preferably is effected at sub-atmospheric pressure.

The heat exchange fluid is preferably D-Limonene, FP40, water/glycol mixture or other available heat exchanger fluid.

The chilled ammonia, which is usually delivered to the fueling station and stored on site in an ammonia storage tank, usually has a temperature before the first heat exchange is effected of between −5 and −77° C., preferably between −10 and −77° C., more preferably of between −20 and −50° C., even more preferably between −25 and −40° C., such as −30° C.

The temperature of the compressed hydrogen after the second heat exchange is selected depending on the desired temperature for filling of vehicle tanks with the compressed hydrogen. Usually, a temperature is selected in between −45 and +5° C. For example, a temperature of 0° C. for filling of bus tanks and −40° C. for filling of car tanks may be selected.

The hydrogen obtained from the ammonia cracking unit is usually compressed to a pressure of 30 M Pa or more.

The present invention furthermore relates to a system, which may also be denoted as hydrogen fueling station, for carrying out the process of the invention in any one of the above described embodiments.

In particular, the system for performing the process comprises an ammonia cracking unit, one or more hydrogen compressing units, wherein the hydrogen from the ammonia cracking unit is compressed, and one or more hydrogen dispensing units, which serve to dispense the compressed hydrogen to vehicle tanks, and further comprises heat exchange means for exchanging heat between chilled ammonia and compressed hydrogen.

The system usually comprises one or more hydrogen storage tanks in which the compressed hydrogen is stored before being dispensed.

The invention also relates to process for fueling of vehicle tanks with compressed hydrogen using the process and/or the system in any one of the embodiments as described herein.

BRIEF DESCRIPTION OF THE DRAWINGS

The present invention will hereinafter be described in conjunction with the appended FIGURE wherein like numerals denote like elements.

FIG. 1 shows an embodiment of the process and integrated system of the invention.

DETAILED DESCRIPTION

In an embodiment, the system of the invention (hydrogen fueling station) for performing the process of the invention comprises an ammonia cracking unit in which ammonia is split into hydrogen and nitrogen and a hydrogen fueling unit for fueling of vehicle tanks with hydrogen from the ammonia cracking unit. The fueling unit also comprises one or more hydrogen compressing units wherein the hydrogen from the ammonia cracking unit is compressed, and one or more dispensing units for dispensing the compressed hydrogen to vehicle tanks which each comprise a nozzle through which the compressed hydrogen is passed to the vehicle tank.

The system further comprises an ammonia storage tank in which chilled ammonia, which is delivered to the station form an outside source, is stored for further use. Still further, a first heat exchanger, which preferably is a counter flow heat exchanger, and a second heat exchanger, which also preferably is a counter flow heat exchanger, are present.

The two heat exchangers are in fluid connection through a pipe system of insulated pipes which forms a closed heat exchange fluid loop. In the loop further present is at least one storage tank for the heat exchange fluid and at least one pump for cicrculating the heat exchange fluid in the loop.

The first heat exchanger is arranged so that it receives chilled ammonia from the ammonia storage tank which is heat exchanged in counter flow with heat exchange fluid present in the heat exchange fluid loop.

Usually, the chilled ammonia will be in a saturated liquid state at a temperature of between −5 and −77° C., and the temperature of the heat exchange fluid before the first heat exchange will be between −35 and −43° C. for car fueling, and −10 to −30° C. for bus fueling.

Hydrogen from the ammonia cracking unit is compressed upstream of the ammonia cracking unit, which preferably is done up to a pressure of 30 MPa or more. Hydrogen is pressured up to 40 MPa or more for H35 fueling, or 90 MPa or more for H70 fueling.

The fueling unit further comprises one or more hydrogen storage tanks in which the compressed hydrogen is stored after the hydrogen has been obtained from the ammonia cracking unit.

The temperature of the compressed hydrogen before the second heat exchange is usually close to ambient temperature, usually between −20° C. and 40° C. in the US, and the temperature of the heat exchange fluid will be between −35 and −43° C. for car fueling, and −10 to −30° C. for bus fueling.

The second heat exchange is effected so that the desired temperature of the compressed hydrogen for dispension to vehicle tanks is obtained, which is usually between −45 and +5° C. For example, a temperature of 0° C. for filling of bus tanks and −40° C. for filling of car tanks may be selected.

EXAMPLE

FIG. 1 shows an embodiment of the process and system of the present invention. Chilled ammonia, usually in liquid state, is delivered to the system from an outside source and is stored in ammonia storage tank 2 until it is fed to the ammonia cracking unit 1. The ammonia cracking unit 1 splits the $NH_3$ into $N_2$ and $H_2$, and may operate in the 5-40 barg pressure range, most commonly in the 7-20 barg range.

The $H_2$ from the ammonia cracking unit 1 is submitted to one or more compression stages in one or more compressors, such as the reciprocating $H_2$ compressor 7 shown in FIG. 1, to pressure it up to 40 MPa or more for H35 fueling, or 80 MPa or more for H70 fueling.

The compressed hydrogen is then directed to one of the hydrogen storage banks, such as $H_2$ storage tank 8, controlled by valve 9. When a vehicle is ready to be filled, valve 10, or in case of several hydrogen storage tanks the appropriate cascade valve, will open, allowing $H_2$ from the storage tank 8 to flow to the $H_2$ dispenser 11, and ultimately to the vehicle tank (not shown). Cascading is well known to the skilled person and is described, for example, in U.S. Pat. No. 8,899,278, starting in col. 1, line 17.

The system further comprises a first heat exchanger 3 which is arranged to received chilled ammonia from the ammonia storage tank 2 for example by means of a pump (not shown). After heat exchange, the heated ammonia is further led to the ammonia cracking unit 1. In heat exchanger 3, in counter current flow to the ammonia is a heat exchange fluid, such as FP 40 or a water/glycol mixture, which is cooled by the heat exchange with the ammonia.

The cooled heat exchange fluid may be stored in heat exchange fluid storage tank 5 and is, when needed, pumped further by pump 6 to heat exchanger 4, in which in counter current flow compressed hydrogen is led through which, accordingly, is cooled down to the desired temperature for vehicle tank filling through dispenser 11.

Heat exchanger 3 and, independently, 4 may be any common heat exchanger, such as a shell-and-tube heat exchanger. The pipe system in which the heat exchange fluid is pumped around is thermally isolated to avoid heating of the heat exchange fluid by the environment.

In one embodiment, the chilled ammonia is in a liquid state, so that heat exchanger 3 may further comprise an expansion unit (not shown) wherein the liquid ammonia is partially, or fully, evaporated during heat exchange with the heat exchange fluid to make use of the vaporization enthalpy of the liquid ammonia for cooling the heat exchange fluid.

For example, if the hydrogen flow rate to be provided by the ammonia cracking unit 1 is 7.5 tons/day, assuming a 100% conversion 42.2 tons/day of ammonia is to be delivered to the ammonia cracking unit 1. Given that the heat capacity of liquid ammonia is 4.744 kJ/kg $NH_3$/K, by heating liquid ammonia during heat exchange by 20 K, a cooling energy of about 4 million kJ is available for cooling of compressed hydrogen.

Furthermore, in embodiments where vaporization of liquid ammonia is used, given that ammonia vaporization enthalpy at 34.15° C. is 23.5 kJ/mol $NH_3$ and assuming again 42.2 tons/day of ammonia flow, a cooling energy available from complete vaporization of ammonia is about 58.3 million kJ/day.

The cooling energy may be used to cool the heat exchange fluid, which, in turn, is used for cooling compressed hydrogen. Again assuming a hydrogen flow rate of 7.5 tons/day which are to be cooled and given the heat capacity of hydrogen being 14 kJ/kg $H_2$/K, for example, a cooling energy of about 6.825 million kJ would be necessary to cool said hydrogen from 25° C. to −40° C. which in part or in full can be provided by the ammonia cooling energy to the heat exchange fluid in heat exchanger 3.

The invention claimed is:

1. A process for fueling of one or more vehicle tanks with compressed hydrogen comprising:
    passing ammonia through a first heat exchanger to cool a heat exchange fluid that is passed through the first heat exchanger to warm the ammonia;
    splitting the ammonia into hydrogen and nitrogen in an ammonia cracking unit after the ammonia is warmed via the first heat exchanger,
    compressing the hydrogen from the ammonia cracking unit,
    passing the heat exchange fluid that has been cooled via the first heat exchanger to a second heat exchanger positioned downstream of the ammonia cracking unit and downstream of at least one compressor performing the compressing of the hydrogen,
    passing the compressed hydrogen through the second heat exchanger to cool the hydrogen for dispensing the hydrogen at a hydrogen fueling unit comprising one or more dispensing units, the heat exchanger fluid passed to the second heat exchanger being warmed to cool the hydrogen passed through the second heat exchanger, and
    dispensing the cooled compressed hydrogen to the one or more vehicle tanks via the hydrogen fueling unit comprising one or more dispensing units.

2. The process according to claim 1, wherein the heat exchange fluid is passed within a closed heat exchange fluid loop defined between the first heat exchanger and the second heat exchanger so that heat exchange between the chilled ammonia and the compressed hydrogen is effected by a first heat exchange between the chilled ammonia and the heat exchange fluid in the first heat exchanger and a second heat exchange of the heat exchange fluid and the compressed hydrogen in the second heat exchanger.

3. The process according to claim 2, comprising:
    storing at least part of the heat exchange fluid in a heat exchange fluid storage tank positioned within the closed heat exchange fluid loop.

4. The process according to claim 3, wherein the heat exchange fluid is stored in the storage tank at a temperature close to the temperature it has after the second heat exchange, and/or is stored at a temperature close to the temperature it has after the first heat exchange.

5. The process according to claim 1, wherein at least one of:
    the ammonia is passed through the first heat exchanger in countercurrent flow with the heat exchange fluid passed through the first heat exchanger; and
    the hydrogen is passed through the second heat exchanger in countercurrent flow with the heat exchange fluid passed through the second heat exchanger.

6. The process according to claim 2, wherein a conventional refrigeration system is used for further cooling of the heat exchange fluid within the closed heat exchange fluid loop.

7. The process according to claim 2, wherein the chilled ammonia is in a liquid state and the first heat exchange involves vaporizing at least a portion of the ammonia in the liquid state.

8. The process according to claim 7, wherein the first heat exchange is utilized to provide an optimal phase change temperature of the ammonia in the liquid state and temperature needed for hydrogen cooling.

9. The process according to claim 7, wherein vaporization of ammonia is effected at sub-atmospheric pressure.

10. The process according to claim 1, wherein the heat exchange fluid is D-Limonene, FP40 or a water/glycol mixture.

11. The process according to claim 1, wherein the ammonia is liquid ammonia before the ammonia is passed to the first heat exchanger, the liquid ammonia having a temperature between −5° C. and −77° C., or having a temperature of between −25° C. and −77° C.

12. The process according to claim 1, wherein the temperature of compressed hydrogen output from the second heat exchanger is between −45° C. and +5° C. for filling of bus tanks and between −33° C. and −40° C. for filling of car tanks.

13. A system for performing the process according to claim 1, comprising the ammonia cracking unit for cracking ammonia, the at least one compressor for compressing the hydrogen output from the ammonia cracking unit and the one or more hydrogen dispensing units, wherein the system further comprises the first heat exchanger and the second heat exchanger cooperating for exchanging heat between the ammonia and the compressed hydrogen via the heat exchange fluid passed through a closed heat exchange fluid loop defined between the first heat exchanger positioned to warm the ammonia and the second heat exchanger positioned to cool the compressed hydrogen.

\* \* \* \* \*